United States Patent [19]
Permuy

[11] Patent Number: 5,952,809
[45] Date of Patent: Sep. 14, 1999

[54] METHODS AND APPARATUS FOR CONTROLLING A SYNCHRONOUS ELECTRIC MOTOR, ESPECIALLY FOR A MOTORISED FAN UNIT FOR A MOTOR VEHICLE

[75] Inventor: Alfred Permuy, Rueil-Malmaison, France

[73] Assignee: Valeo Electronique, Creteil Cedex, France

[21] Appl. No.: 08/940,407

[22] Filed: Sep. 30, 1997

[30] Foreign Application Priority Data

Sep. 30, 1996 [FR] France ................................ 96 11897

[51] Int. Cl.$^6$ .................................................... H02P 1/46
[52] U.S. Cl. ............................................................. 318/700
[58] Field of Search .................................... 318/700, 800, 318/801, 803, 721, 254

[56] References Cited

FOREIGN PATENT DOCUMENTS

88/00771  1/1988  WIPO .

OTHER PUBLICATIONS

Saso Vlahu: "New brushless AC servo drive uses isolated gate biopolar power transistors and a CPU to obtain high dynamic performance with exceptionally high reliabity and efficiency" Oct. 7, 1990, Conference Record of the Industry Applications Society Annual Mtg, Seattle, Oct. 7–12, 1990, vol. 1, Nr. meeting 25, pp. 6856–6890, Institute of Electrical and Electronics Engineers XP000204096.

French Search Report dated Jun. 20, 1997.

*Primary Examiner*—William M. Shoop, Jr.
*Assistant Examiner*—Rina I. Duda
*Attorney, Agent, or Firm*—Morgan & Finnegan LLP

[57] ABSTRACT

A control device for a three-phase motor of a fan for a motor vehicle includes a current generator for the armature winding of the motor corresponding to each phase. Each current generator receives an input command signal such that the vector defined by the current intensities generated by the current generators is proportional to the vector $\vec{V} - Z\vec{I}$ where $\vec{V}$ is a vector defined by the different voltages measured for the windings, $\vec{I}$ is a vector defined by the different currents measured for the windings, and Z is an operator corresponding to the impedance of the windings.

14 Claims, 2 Drawing Sheets

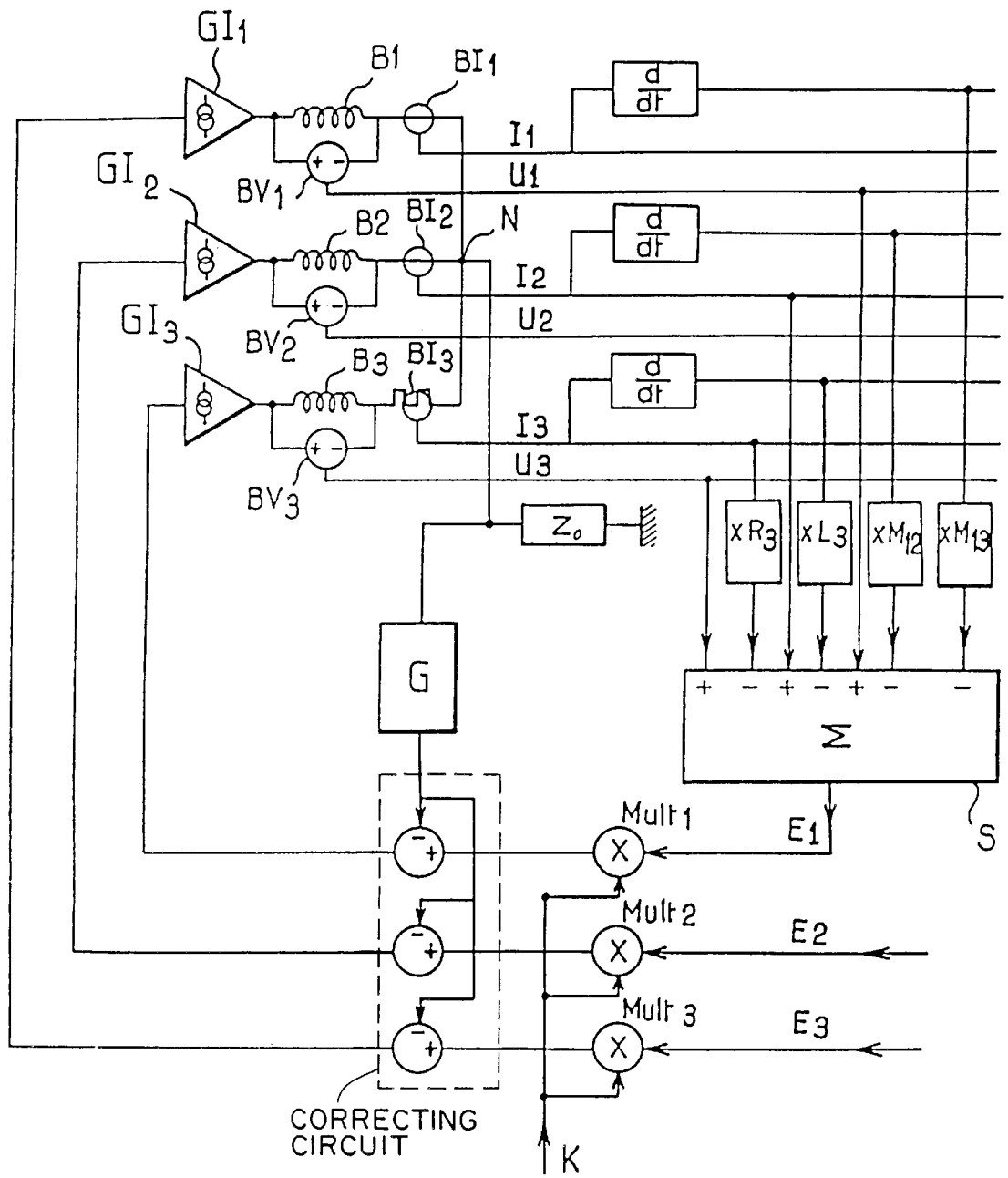
FIG_1

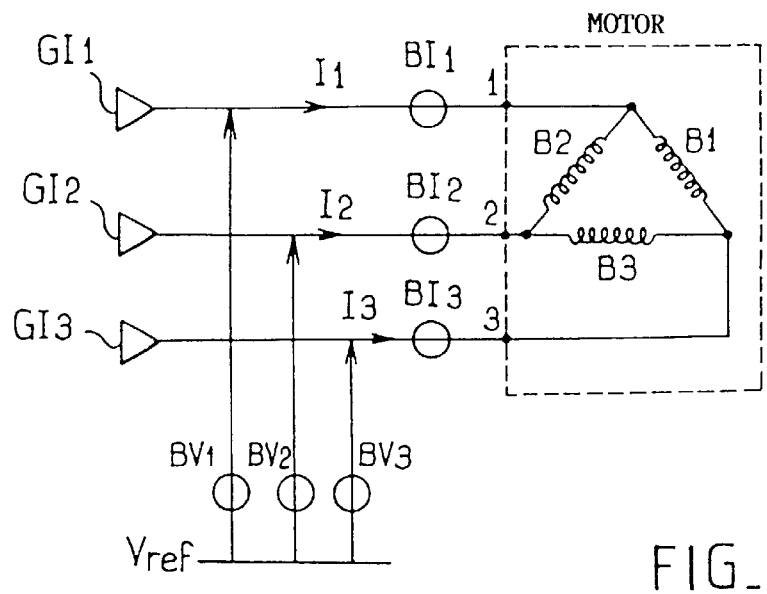
FIG_2
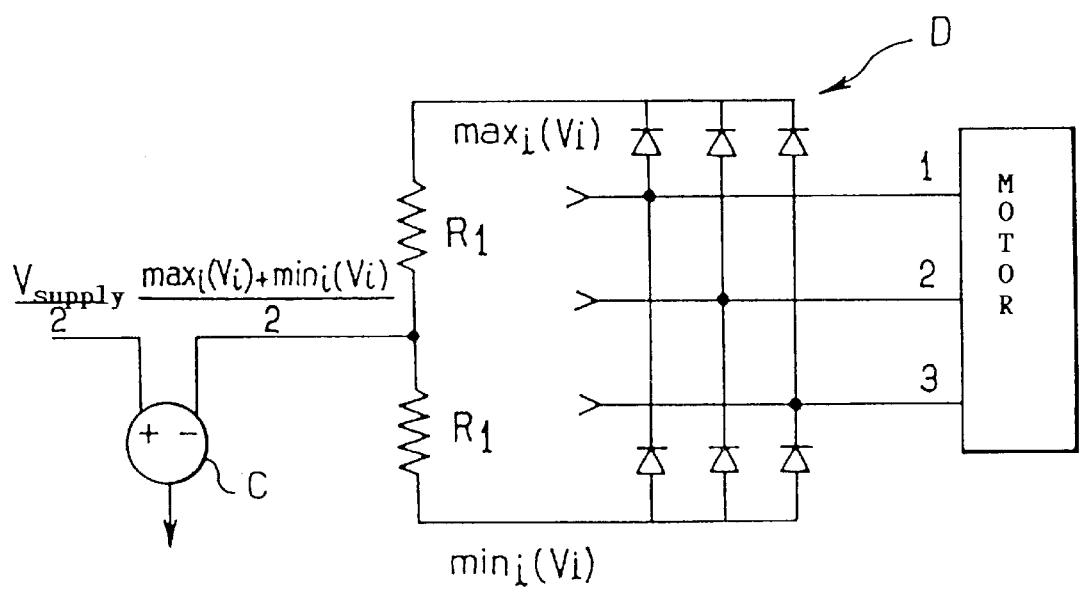
FIG_3

METHODS AND APPARATUS FOR CONTROLLING A SYNCHRONOUS ELECTRIC MOTOR, ESPECIALLY FOR A MOTORISED FAN UNIT FOR A MOTOR VEHICLE

FIELD OF THE INVENTION

The present invention relates to methods and apparatuses for controlling the power supply to a synchronous electric motor, in particular a motor of a motorized fan unit, in which the motor is coupled to a fan or a blower, for a motor vehicle.

BACKGROUND OF THE INVENTION

Synchronous electric motors in motorized fan units require to be of high power, and to give high outputs. Because such motors are fitted in confined spaces under the hood of the vehicle, it is not possible to allow such motors or their control means to emit unduly high amounts of heat. It is therefore, very desirable to obtain a considerable reduction in heat loss in such motors.

It is known that the mechanical power $P_{Mec}$ of an electric motor is given by the expression $P_{Mec} = \vec{E} \cdot \vec{I}$, and that the energy losses $P_T$ these are given by the expression $P_T = RI^2$, where $\vec{E}$ is a vector the different components of which correspond to the counter-electromotive forces in the various windings of the armature of the motor; and where $\vec{I}$ is a vector the different components of which correspond to the current intensities in the different windings. The expression $\vec{E} \cdot \vec{I}$ is given by:

$$\vec{E} \cdot \vec{I} = \sum_{i=1}^{n} \lim(T \to +\infty) \cdot T^{-1} \int E_i(t) \cdot I_i(t) dt,$$

where n is the number of phases in the motor and T is the period of the control signals.

For a given power $P_{mec}$, the losses $P_T$ are minimised if $\vec{E}$ and $\vec{I}$ are proportional to each other.

One solution which a person skilled in the art could consider in rendering the vectors $\vec{E}$ and $\vec{I}$ proportional to each other, would be to apply to the various windings supply currents which follow predetermined laws of variation analagous to those of the counter-electromotive forces which are known beforehand, and to synchronise this current supply with the rotation of the rotor.

However, this is not an optimum solution. The laws of variation of the counter-electromotive forces change significantly over time, due in particular to the thermal effects of the ferrites of the motor, or again to the reactions in the armature, which distort these counter-electromotive forces. These variation laws also vary significantly from one motor to another, or even from one winding to another. As a result of this, the theoretical laws of variation that could be imposed on the currents in the windings can only be appoximate, and can only lead to the heat losses not being optimised.

In addition, such a solution would have the disadvantage of requiring an electronic synchronising unit to be provided.

SUMMARY OF THE INVENTION

According to the invention, a control device for a multi-phase electric motor, preferably for a motorized fan unit for a motor vehicle, is characterised in that the various windings of the armature that correspond to the different phases are supplied through current generators, and in that, for control of the current generators, the device includes means for measuring the voltages across the different windings, means for measuring the intensities of the currents flowing through the different windings, and means for determining, as a function of the measured values of current and voltage, command signals which are applied to the control inputs of the current generators, such that the vector defined by the current intensities generated by the current generators is proportional to the vector $\vec{V} - Z\vec{I}$, where $\vec{V}$ is a vector defined by the various voltages measured for the different windings, $\vec{I}$ is a vector defined by the various current intensities measured for the different windings, and Z is an operator which corresponds to the impedance of the windings.

With such a control system, the vector $\vec{E}$, which, as will be understood from the remainder of this description, corresponds substantially to $\vec{V} - Z\vec{I}$, is maintained proportional to $\vec{I}$. Consequently, energy losses are minimized for any given mechanical power output. In addition, no electronic synchronizing device is needed.

According to a preferred feature of the invention, the control device includes means for applying to a given parameter the coefficient of proportionality between the vector constituted by the various intensities of the currents generated by the current generators, and the vector $\vec{V} - Z\vec{I}$. In that case, the control device preferably includes means for applying this coefficient of proportionality as a function of the rotor speed of the motor.

In the case of a star-wound motor, the common node of its windings is preferably connected to a neutral point through an impedance.

Where the motor is star-wound, the command signals are preferably corrected by a signal which corresponds to the intensity of the current at the output of the windings, at the node common to the windings, with the reaction loops thus formed enabling the current intensity to be maintained around a nil value.

Again where the motor is star-wound, the means for measuring the intensities of the currents flowing in the various windings are preferably situated on the branches of the windings on the opposite side from the current generators.

Preferably, the means for determining the command signals comprise operational amplifiers consisting of differential operators (or differentiators) and an adder or summation unit.

The means for measuring voltages across the windings preferably comprise differential amplifiers.

The means for measuring the intensities of currents flowing in the windings preferably include shunt-type connections, across the terminals of which a voltage representing the current is measured. Alternatively, these means may comprise Hall effect sensors.

Further features and advantages of the invention will appear more clearly in the following detailed description of some preferred embodiments of the invention, which are given by way of non-limiting example only and with reference to the accompanying drawings.

BRIEF DESCRIPTION OF THE DRAWINGS

FIG. 1 is a simplified circuit diagram for a control device in one possible embodiment of the invention, in which the armature windings of the motor are connected in a star-wound configuration.

FIG. 2 shows in a diagram a delta-wound connection equivalent to the star winding in the device of FIG. 1.

FIG. 3 shows a circuit which enables the quantity $\text{In}^{-1}\Sigma \text{Vi}$ to be applied to the delta-wound configuration of FIG. 2.

DESCRIPTION OF PREFERRED EMBODIMENTS OF THE INVENTION

FIG. 1 shows the windings $B_1$, $B_2$, $B_3$ of the armature of a three-phase synchronous motor. In this example, the windings $B_1$ to $B_3$ are connected in a star-wound configuration. Each of the windings is supplied with power by a current generator $GI_1$, $GI_2$ and $GI_3$. The current generators $GI_1$ to $GI_3$ are connected to the ends of the windings $B_1$ to $B_3$ opposed to their common node, which is denoted by the reference N in FIG. 1.

The control device for the power supply to the motor includes, on each of the branches of the armature windings $B_1$ to $B_3$, current measuring means $BI_1$, $BI_2$, $BI_3$ for measuring the intensity $I_1$, $I_2$, $I_3$ of the current flowing in each of these different branches. In the star-wound case, as indicated in FIG. 1, the current measuring means $BI_1$ to $BI_3$ consist for example of a shunt, such that the voltage across the shunt represents the current in the motor winding concerned. This voltage is measured. Alternatively, the current measuring means may consist of Hall effect sensors. In either case, the current measuring means are preferably arranged on the branches of the armature windings $B_1$ to $B_3$ on the side opposite to the current generators $GI_1$ to $GI_3$.

In the case where the current is generated by pulsed-current generators, the currents which are read by the measuring means $BI_1$ to $BI_3$ are not perturbed by the variations engendered by pulsing of the current. In addition, the node N which is common to the various windings is at a neutral voltage, and this enables the currents to be measured by shunt-type measuring means at points where the voltage is close to that of the neutral point.

Voltage measuring means $BV_1$ to $BV_3$ are connected in parallel on the windings $B_1$ to $B_3$, for measuring the voltages $V_1$ to $V_3$ across these windings.

The signals representing the measured current intensities $I_1$ to $I_3$ are passed to differential operators or differentiators d/dt and multipliers (amplifiers), the output signals are passed, together with the signals representing the measured voltages $V_1$ to $V_3$, to a summation unit, or adder, S. These differentiators, and the adder S, are such that the adder has three outputs $E_1$, $E_2$, $E_3$ which correspond to a vector $\vec{E}$ which is such that:

$$\vec{E} = \vec{V} - Z\vec{I}$$

where Z is an operator that corresponds to the impedance of the windings, that is to say to the function $$R_i + L_i \, d/dt + M_{ij} \, d/dt,$$

where $R_i$ and $L_i$ are coefficients of resistance and inductance of the branch i, and where the coefficients $M_{ij}$ are the coefficients of mutual induction of the branches i and j.

The differential operators d/dt and the adder S are preferably in the form of operational amplifiers, and measurement of the voltage across the terminals of each of the phases is obtained by means of differential amplifiers. Because of its low cost, such a configuration is preferably digital.

The three output signals $E_1$, $E_2$, $E_3$ of the adder S are then passed to multipliers $\text{Mult}_1$ to $\text{Mult}_3$, in which each of them is multiplied by the same coefficient, K.

The output signals from the multipliers $\text{Mult}_1$ to $\text{Mult}_3$ are used as command signals for the control of the current generators $GI_1$ to $GI_3$, the output of which supplies the windings $B_1$ to $B_3$ with power. The current intensities $I_1$ to $I_3$ which are generated are proportional to these command signals. The coefficient K is the parameter that regulates the speed of the electric motor. Its value is, for example, set so as to impose a constant speed on the motor.

In order to maintain the neutral voltage at the common node N of the various windings $B_1$ to $B_3$, this common node N is connected to ground through an impedance $Z_0$. In this connection, it will be recalled that, for the power supply of an electric motor of a motorized fan unit for a motor vehicle, the neutral voltage generally corresponds to one half of the battery voltage.

In another version, in order to maintain this common point at neutral voltage, a voltage pulsing circuit may be provided, connecting the common node N alternately to ground and to the battery voltage.

In the case of a star-wound motor armature, maintaining the node N common to the various armature windings Bi at neutral voltage enables a constraint to be imposed on the system which prevents the system from operating in such a way that the current generators $GI_i$ no longer work correctly.

In a further version, which may be used in a manner which is complementary to one or another of the two arrangements described above, it can be arranged that the command signals given at the outputs of the three multipliers $\text{Mult}_1$ to $\text{Mult}_3$ are corrected by the resultant current at the point N on the output side of the windings $B_1$ to $B_3$. This resultant current is for example distributed identically to the outputs of each multiplier $\text{Mult}_1$ to $\text{Mult}_3$, after it has (if necessary) been processed by a stabilizing filter G. In this way, the loops of the control device react so as to maintain the output current, at their common node N, at around a zero value.

A correcting circuit, using the resultant current at point N on the output side of the windings B1 to B3, to correct the outputs of the three multipliers Mult1 to Mult3 is illustrated on FIG. 1.

In general terms, in the case of both star winding and delta winding, it can be shown that if the stator windings are symmetrical, we have:

$$\Sigma I1_{measured} = 0, \text{ and}$$

$$\vec{E} = \vec{V} - Z\vec{I}_{measured} - n^{-1} \sum Vi \begin{pmatrix} 1 \\ \vdots \\ 1 \end{pmatrix}.$$

However, the following expression applies in practice, due to the computations and to errors or tolerances in the command signal:

$$\Sigma I_{command} = \epsilon \neq 0.$$

The voltages Vi across the various windings of the motor therefore tend to vary by increasing if $\epsilon > 0$, and by decreasing if $\epsilon < 0$. This is why it is necessary to apply the quantity $n^{-1}\Sigma V_i$, for example, by maintaining it at the neutral voltage. This can easily be done, as is clear from the foregoing, in the case of a star-wound motor.

FIG. 2 shows a delta winding which is equivalent to the star winding in FIG. 1. In this delta winding, the voltages $V_1$, $V_2$ and $V_3$ are measured by the voltage measuring means $BV_1$, $BV_2$ and $BV_3$ respectively at the common node between $B_1$ and $B_2$, at the common node between $B_2$ and $B_3$, and at the common node between $B_3$ and $B_1$.

FIG. 3 shows a circuit which enables a constraint to be imposed which applies a magnitude similar to $n^{-1}\Sigma V_i$ to the neutral voltage. This circuit comprises a rectifier bridge D which is connected to the various nodes 1 to 3 of the stator windings. The voltages at the two ends of this rectifier bridge correspond respectively to $\max_i(Vi)$ and $\min_i(Vi)$. The two ends of the bridge are connected through two balanced resistors $R_1$ to a common point, which is consequently at the voltage $$(\max_i(Vi)+\min_i(Vi))/2.$$

The voltage at this common point is injected, with the voltage Vsupply/2, to the input of a comparator C, the output of which controls the various current generators $GI_1$ to $GI_3$, in such a way that by adding or subtracting current, the quantity $(\max_i(Vi)+\min_i(Vi))/2$ is applied to Vsupply/2, that is to say to the neutral voltage (6 volts).

With an arrangement of the type described above, vectors $\vec{E}$ and $\vec{I}$ are permanently parallel, without any need for synchronization of control with respect to the rotation of the rotor of the motor. In addition, the voltage setting obtained is particularly stable, especially with respect to temperature. In particular, the coefficients of self-inductance and mutual inductance that prevail within the loops undergo very little variation.

The coefficients of resistance are themselves liable to vary with temperature, but their variation only introduces on the vector $\vec{E}$ a variation which is proportional to the vector $\vec{I}$, so that these two vectors remain proportional to each other.

It will be very clear that it is necessary to connect a sequencing device ("blind", or using rotor position sensors), in order to start the motor to a speed which is sufficiently high for the measured electromotive forces Ei to be significant.

What is claimed is:

1. A control device for a multi-phase electric motor having an armature winding for each phase, the control device comprising:

a plurality of current generators, each current generator corresponding to one of said phases and having its output connected to the corresponding winding of said phase so as to supply current to said winding;

a plurality of voltage measuring means, each voltage measuring means connected across a respective one of said windings for measuring the voltage across that winding;

a plurality of current measuring means, each current measuring means connected to a respective one of said windings for measuring the intensity of current in that winding; and command signal generating means connected to said plurality of current measuring means and connected to said plurality of voltage measuring means, for determining, in response to currents and voltages measured thereby, command signals for the current generators, the command signal generating means having a plurality of outputs each connected to an input of a respective one of said current generators, the command signal generating means modifying the plurality of outputs so that a vector defined by intensities of currents generated by the current generators and supplied to the windings is proportional to a vector defined as V–ZI, where V is a vector defined by the respective voltages as measured on the windings by the respective voltage measuring means, I is a vector defined by the respective intensities of currents as measured on the windings by the respective current measuring means, and Z is an operator corresponding to an impedance of the windings.

2. A device according to claim 1, further including means for applying to the plurality of outputs of the command signal generating means a coefficient of proportionality, the coefficient of proportionality being proportional to a ratio between the vector constituted by the various intensities of the currents generated by the current generators and supplied to the windings and the vector defined as V–ZI.

3. A device according to claim 2, where said means for applying to the plurality of outputs of the command signal generating means a coefficient of proportionality comprises means for setting said coefficient of proportionality as a function of a motor speed of the motor.

4. A device according to claim 1, in which said motor windings are in a star-wound configuration having a common node, the device further including a neutral point and an impedance connecting said node to said neutral point.

5. A device according to claim 1, wherein the armature windings are in a star-wound configuration defining a node common to said windings, the device including a correcting means connected to said common node for receiving therefrom a signal corresponding to the intensity of current at the common node, whereby said command signals are corrected by said correcting means to maintain the intensity of current at the common node around a zero value.

6. A device according to claim 1, in which the motor windings are in a star-wound configuration, each of said current measuring means being connected on the opposite side of the corresponding winding from the current generator associated with that winding.

7. A device according to claim 1, wherein the command signal generating means include operational amplifiers which consist of differentiators and a summation unit connected to the differentiators.

8. A device according to claim 1, wherein the voltage measuring means comprise differential amplifiers.

9. A device according to claim 1, wherein the current measuring means comprise a shunt connected to each winding, and means for measuring across each shunt a voltage.

10. A device according to claim 1, wherein said current measuring means comprise Hall effect sensors.

11. A method for controlling a synchronous electric fan motor of a motor vehicle, the electric motor including a plurality of windings, the method comprising:

generating a current for each of the plurality of windings with a respective current generator;

measuring a voltage across each of the plurality of windings with a respective voltage measuring circuit;

measuring a current in each of the plurality of windings with a respective current measuring circuit; and generating command signals with a plurality of command signal generating circuits for a respective current generator, each command signal generating circuit connected to and receiving signals from a respective current measuring circuit and each command signal generating circuit connected to and receiving signals from a respective voltage measuring circuit, responsive to the command signals, outputs of the current generators modified so that a vector defined by currents generated for the windings by the current generators is proportional to a vector defined as V–ZI, where V is a vector defined by the voltages measured across the windings by the voltage measuring circuits, I is a vector defined by the currents measured in the windings by the current measuring circuits, and Z is an operator corresponding to an impedance of the windings.

12. A method according to claim 11, further comprising modifying the outputs of the current generators with a coefficient of proportionality, the coefficient of proportionality being proportional to a ratio between the vector defined by the currents generated for the windings by the current generators and the vector defined as V–ZI.

13. A method according to claim 11, further comprising setting the coefficient of proportionality as a function of a motor speed of the motor.

14. A method according to claim 11, wherein the windings are in a star-wound configuration defining a node common to the windings, further including a correcting circuit connected to the common node for receiving therefrom a signal corresponding to the intensity of current at the output of the windings, the method further comprising correcting the command signals with the correcting circuit to maintain the intensity of current at the common node around a zero value.

* * * * *